United States Patent Office 2,942,428
Patented June 28, 1960

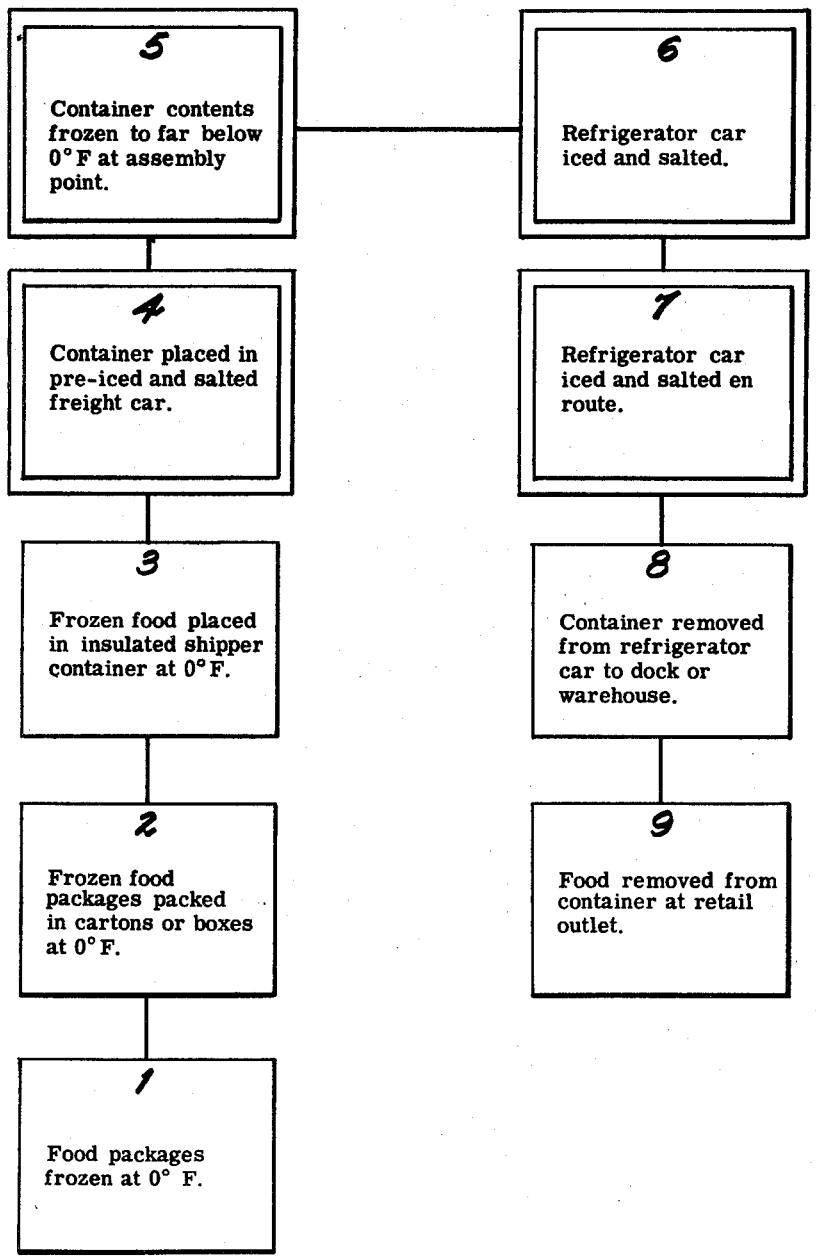

2,942,428

METHOD OF SHIPPING FROZEN FOOD

Willard Langdon Morrison, Lake Forest, Ill., assignor, by mesne assignments, to Liquefreeze Company, Inc., New York, N.Y., a corporation of New York Filed Oct. 23, 1957, Ser. No. 691,986

4 Claims. (Cl. 62—60)

My invention relates to improvements in method of storing and shipping perishable material and is especially well adapted to the storage and shipment of foodstuffs in frozen condition.

One object of my invention is to protect the material against undesired rise in temperature at all times prior to distribution.

Another object of my invention is to protect the packages containing material against deterioration as a result of contact with moisture laden air.

Another object of my invention is to permit the shipment of the material under conditions such that with a minimum of expense for refrigeration in transit, the material will reach destination at a safe low temperature.

The shipment of such material in refrigerated cars is well known. Cars chilled with ice and salt can be maintained at a temperature in the order of 12 to 20° F., 12° being the target seldom if ever reached. Frozen foods are habitually frozen at approximately zero degrees and in the past they have been shipped in such salt and ice cooled refrigerated cases in the hopes that, exposed as the frozen food is to 12 to 20° F., the temperature will stay near enough to the desired zero degree low temperature to avoid excessive deterioration.

Often this hope is not realized and the foodstuffs in transit rise to a temperature above freezing. When this happens they are again frozen at destination, and an inferior product is the result.

I propose to pack the foodstuffs frozen at the packing plant at zero or thereabouts in a portable insulating shipper container which will be closed against entrance of ambient air. This will usually be done in the atmosphere of the freezing plant so that the air in the container will usually be approximately zero and with low moisture content. The container or containers will then be shipped in a refrigerator car, ice cooled to 20° F. to a central assembly point. During travel from the packing plant to assembly point, the container will thus be exposed to the low temperature of the refrigerator car and not to ambient temperature.

At the assembly point, the contents of each shipper container will be chilled far below zero degrees by the introduction into the container of a cold boiling liquid such as nitrogen at atmospheric pressure. The desired low temperature will depend upon the expected time of transit and the amount of liquid nitrogen evaporated in the shipper container to achieve the desired low temperature will depend on such temperature. The nitrogen gas will expel from the shipper container the air originally contained in it.

The shipper container or containers will then be shipped to destination in a refrigerator car which car will during transit by icing and salt when, as and if necessary, be maintained at approximately 12 to 20° F. so that in transit, the temperature to which the container is exposed will be not ambient but the relatively constant temperature maintained in the refrigerator.

Upon reaching destination, the shipper container will be removed from the car and sent to the point of final opening, perhaps a retail food store and then and then only will the contents be exposed to ambient air. From the time freezing was completed to the time the food package is put into the freezer display counter, it is never exposed to direct contact with warm ambient moisture laden air, so deterioration by condensation or frost deposit on the package cannot occur.

Since the frozen foodstuffs and the insulated shipper container are protected against the wide range of temperature variation to which they would otherwise be exposed in the absence of the controlled temperature in the refrigerator car. The temperature of the foodstuffs, provided the initial or starting temperature is low enough, will remain below the danger point up to the time of delivery.

My invention is illustrated more or less diagrammatically in the accompanying flow sheet wherein like parts are indicated by like characters in the drawings and specification.

At a food processing station 1, food in the usual way, without any change in methods heretofore commercially used, is packaged. Labels are applied and the individual packages are then frozen to temperature in the order of zero degrees F. At station 2, the small, frequently approximately one pound packages of frozen food are for convenience and economy packed in cartons or boxes still at zero degrees F. This usually takes place in a cold storage area where the boxes and the cartons are exposed only to cold, dry air at, in the order of, zero degrees F. The frozen food packages whether in cartons or boxes will remain at the food processing plant in cold storage until they are to be shipped.

At station 3, the cartons or boxes or—if the step of packing them in cartons or boxes is as it may be omitted—the packages themselves will be placed in insulated shipper containers which will usually be much smaller than carload lots, the containers being of such size that they can be brought into and filled with the foodstuff in the cold storage area of the processing plant and thus the men working are exposed only to the normal cold of the storage area in the packing plant and before leaving that area, the shipper containers will be closed against entrance of ambient air. This packing of the foodstuff in the shipper containers may take place after the foodstuff is frozen.

At station 4, the shipper containers will be loaded into a precooled iced and salted freight car which has been sent to the packing plant in precooled condition and wherein its temperature will be in the order of 12 to 20° F. The car will then be shipped to station 5 where the contents of each shipper container will be lowered independent of the temperature prevailing in the car, preferably by the discharge of liquid nitrogen at atmospheric pressure into the container to a temperature far below the temperature at which the foodstuff was packed in the shipper container.

This temperature may be many degrees below zero depending upon the distance of shipment and the probable time of shipment but in estimating the temperature to which the foodstuff should be lowered outside ambient temperature can be disregarded because the ice, salt refrigeration will maintain the temperature in the car in the order of 12 to 20° F. independent of ambient conditions.

This cooling of the contents of each shipper container may take place while the containers are left in the car in which they came or to some other iced car.

When the liquefreeze containers and their contents have been chilled to the desired low point, the cars containing them which have been iced and salted at station 6, will be made up in a train for shipment, perhaps from California to New York.

In order that the temperature to which the outside of each liquefreeze container is exposed remain within the range of say 12 to 20° F., the cars will as necessary enroute be periodically iced and salted at station or stations 7.

When the car has reached its destination, containers will be removed to dock or storage station 8. At station 8, the containers may or may not be placed in cold storage but as soon thereafter they will be shipped by truck to the grocery or supermarket at station 9 where the container will for the first time be opened for the removal of the frozen food.

During this entire sequence, the contents of the shipper container will never be exposed to ambient air. The container is sealed against ambient air as it enters and while in the freight car. It remains, except while the nitrogen is inserted, sealed until it reaches the retail grocery and there is never any opportunity for any moisture laden air at ambient temperature to enter the shipper container so no frosting or condensation can occur to spoil the appearance of the labels. The packages and the cartons will be exposed only to cold, dry air up to the time that the contents of the shipper container is chilled with liquid nitrogen. After the shipper container has been chilled by nitrogen, the nitrogen will replace the air so that up to the time that the shipper container is finally opened, there is no opportunity for any contact between the contents of the container and the moist warm air.

The shipper container itself is insulated and is exposed to ambient air only as it passes from the packaging plant to the freight car that initially receives, or when it is taken out of the freight car to be cooled to −30° F. or less and during interval between arrival of the car at destination and final opening of the container. During the rest of the time of transit from packing house to destination, the shipper container itself is exposed only to the controlled temperature resulting from ice and salt in the rferigeration car in the order of 12 to 20° F.

If food frozen at approximately zero is shipped in the usual type of refrigerator car with temperatures maintained at from 12 to 20° F., there will be a rise in temperature of the frozen food and it frequently happens that when the frozen food reaches the destination the temperature has risen above zero. Sometimes it actually rises above freezing and is by the local distributor or by the intermediate warehouse again frozen with resultant deterioration. It is not possible to guarantee the arrival of frozen food at destination at zero degrees F. because the lowest temperature that can be obtained by salt and ice in the refrigerator car is somewhere between 12 and 20 degrees F. usually nearer 20 than 12 degrees so there is bound to be a rise above zero.

It is an established fact that by proper icing and salting at proper times, the temperature inside a refrigerator car may be maintained between certain predetermined limits well below normal ambient air temperatures. Arrangements for maintaining these temperatures by salt and ice are found all over the railroad systems of this country.

When a cargo is shipped from one point, say in California to another one in New York, no one can possibly predict with any safe degree of accuracy the range of ambient air temperatures to which it is to be exposed, nor can the time intervals or the timing of such exposure be safely predicted. The approximate time of transit can with a very substantial degree of safety be predicted and the rate of heat flow through the insulation of the shipper container can be determined.

Therefore, when a shipment is to be made and the time of probable transit has been determined, it is an easy task to determine the starting temperature of the load that will be necessary to have arrival with the temperature below zero when the outside temperature to which the shipper container is to be exposed in the car is a constant. This makes for much more efficient use of the more expensive nitrogen or other super cooling means. A much smaller factor of safety can be used in the calculations because of the fact that it is known that the temperature to which the outside of the container will be exposed is within a very narrow range. The temperature to which the contents must be reduced is, of course, much higher for a given length of time when the worst conditions will be 20 degrees F. than it would be if the container was likely to be exposed to temperatures of 100° or more.

An important additional advantage of the use of the shipper container is that relatively small batches of material may be packed at the freezing point for the ultimate disposer or grocer in sharp contrast to the necessity of shipping in carload lots when the shipper container is not used.

Another advantage is that it becomes possible to effectively use the conventional type of refrigerator car with the insulation standard for salt, ice operation, thus avoiding the necessity of providing heavy insulation for the car as is customary when temperatures far below zero are to be maintained by means other than ice and salt.

Since the frozen foodstuff in the shipper container is reduced to a temperature below zero, the temperature to which it was frozen in the first instance and since the shipper container in order to limit heat penetration is exposed to an atmosphere the temperature of which is generally constant above zero, normally below freezing and usually in the range of 12 to 20° F., in a sense it can well be said that no matter what happens to the shipper container, whether it stands still or is moved about or is shipped in inter-state transit, still the method of storing the food is the same whether at rest or in transit.

I claim:

1. The method of shipping food which consists in freezing separate packages to a temperature approximately zero degrees F., placing the packages in an insulated portable container, closing it against entrance of air, placing the container in a refrigerated freight car the temperature of which is maintained between 12 and 20 degrees F., shipping the car to an assembly point opening the container and, cooling the container contents to a temperature below zero degrees F., closing the container against the entrance of air, shipping the container in an insulated freight car to destination while maintaining the temperature in the car between 12 and 20 degrees F., upon arrival at destination removing the container from the car, taking it to point of use and there opening it and removing its contents.

2. The method of shipping food which consists in freezing separate packages to a temperature approximately zero degrees F., placing the packages in an insulated portable container, closing it against entrance of air, placing the container in a refrigerated freight car, the temperature of which is maintained between 12 and 20 degrees F., shipping the car to an assembly point opening the container and, injecting liquid nitrogen at atmospheric pressure into the container until its contents is cooled to a temperature below zero degrees F., closing the container against the entrance of air, shipping the container in an insulated freight car to destination while maintaining the temperature in the car between 12 and 20 degrees F., upon arrival at destination removing the container from the car, taking it to point of use and there opening it and removing its contents.

3. The method of preserving and shipping perishable goods which consists in first packaging and labeling the material in separate packages in unfrozen condition, then separately freezing each package to a temperature in the order of zero degrees F., assembling and packing a plurality of such packages in a carton still at approximately zero degrees F., then packing a plurality of such cartons still at zero degrees F., in an insulated portable shipper container and closing the container to prevent entry of ambient air, then packing a plurality of containers in an insulated precooled car, the temperature of which is in the order of from 12 to 20 degrees F., conveying such car to an assembly point, opening the container and, then discharging liquid nitrogen, a cold boiling liquid coolant at atmospheric pressure and temperatures far below zero degrees into each shipper container until the temperature of the contents independent of the temperature of the car is lowered far below zero, then closing the container and while maintaining the temperature of the air in the car about the shipper containers in the range between 12 and 20 degrees F., shipping the car to destination, then unloading the shipper containers from the car while maintaining them sealed against the entrance of ambient air and carrying each shipper container to the point at which the contents are to be distributed for use.

4. The method of preserving food which consists in freezing separate food packages to a temperature in the order of zero degrees F., assembling such packages, while exposed only to cold dry air, in cartons at substantially zero degrees F., placing such cartons, while exposed to only cold, dry air, in an insulated container, at substantially zero degrees F., closing the container against entrance of outside air and maintaining the air to which the exterior of the container is exposed at a temperature in the order of from 12 to 20 degrees F.

References Cited in the file of this patent

UNITED STATES PATENTS

| | | |
|---|---|---|
| 2,381,796 | Williams | Apr. 7, 1945 |
| 2,501,141 | Plummer et al. | Mar. 21, 1950 |
| 2,586,893 | Westling | Feb. 26, 1952 |
| 2,618,939 | Morrison | Nov. 25, 1952 |
| 2,676,467 | Morrison | Apr. 27, 1954 |
| 2,784,567 | Reynolds | Mar. 12, 1957 |